(12) United States Patent
McKenna

(10) Patent No.: US 9,820,013 B2
(45) Date of Patent: Nov. 14, 2017

(54) SYSTEM AND METHOD FOR OPAQUE METADATA TRANSMISSION

(71) Applicant: NBCUniversal Media, LLC, New York, NY (US)

(72) Inventor: Matthew McKenna, Rahway, NJ (US)

(73) Assignee: NBCUNIVERSAL MEDIA, LLC, New York, NY (US)

(*) Notice: Subject to any disclaimer, the term of this patent is extended or adjusted under 35 U.S.C. 154(b) by 0 days.

(21) Appl. No.: 14/463,485

(22) Filed: Aug. 19, 2014

(65) Prior Publication Data

US 2016/0057507 A1 Feb. 25, 2016

(51) Int. Cl.
| | |
|---|---|
| *H04N 7/16* | (2011.01) |
| *H04N 21/835* | (2011.01) |
| *H04N 21/8547* | (2011.01) |
| *H04N 21/437* | (2011.01) |
| *H04N 21/435* | (2011.01) |
| *H04N 21/643* | (2011.01) |
| *H04N 21/439* | (2011.01) |
| *H04N 21/4722* | (2011.01) |

(52) U.S. Cl.
CPC ......... *H04N 21/835* (2013.01); *H04N 21/435* (2013.01); *H04N 21/437* (2013.01); *H04N 21/439* (2013.01); *H04N 21/4722* (2013.01); *H04N 21/64322* (2013.01); *H04N 21/8547* (2013.01)

(58) Field of Classification Search
CPC ............ H04N 21/835; H04N 21/8547; H04N 21/437; H04N 21/435; H04N 21/64322; H04N 21/439; H04N 21/4722
See application file for complete search history.

(56) References Cited

U.S. PATENT DOCUMENTS

| | | | |
|---|---|---|---|
| 9,411,809 B1* | 8/2016 | Sabbavarapu | G06F 17/30053 |
| 2006/0129488 A1* | 6/2006 | Vincent | G06F 21/6218 705/50 |
| 2007/0055689 A1* | 3/2007 | Rhoads | G06F 17/30026 |
| 2009/0007188 A1* | 1/2009 | Omernick | H04N 21/2402 725/62 |

\* cited by examiner

*Primary Examiner* — Yassin Alata
(74) *Attorney, Agent, or Firm* — Lee, Hong, Degerman, Kang & Waimey PC

(57) ABSTRACT

According to one embodiment, a content distribution method includes: generating a security identifier associated with content; storing the security identifier to be associated with metadata related to the content; providing the content and the security identifier to a receiving entity; and receiving a metadata request from the receiving entity, wherein the metadata request corresponds to the metadata related to the content.

17 Claims, 4 Drawing Sheets

SYSTEM AND METHOD FOR OPAQUE METADATA TRANSMISSION

BACKGROUND

In a linear broadcast, content (e.g., video and/or audio content) is distributed in a manner such that the progression of the content cannot be navigationally controlled by a viewer. In certain cases (including a television broadcast), the content includes primary content such as a news program, a sports program, a drama program, etc. In addition, the content may also include secondary content, e.g., an alternative-language audio track that is similar to the secondary audio programming (SAP) that is commonly associated with analog television. The secondary content is distributed in a manner such that it is openly available to receivers of the broadcast.

SUMMARY

According to one embodiment, a content distribution method includes: associating a security identifier with metadata descriptive of content; providing the content and the security identifier to a receiving entity; and receiving a metadata request from the receiving entity in response to a change in value of the security identifier.

According to one embodiment, a method of receiving content includes: receiving the content from a distributing entity; extracting a security identifier from the received content; and sending, to the distributing entity, a request upon detecting a change in value of the extracted security identifier. The request is for metadata corresponding to the received content.

According to one embodiment, a system for distributing content includes: a transmitter configured to provide the content and a security identifier to a receiving entity, wherein the security identifier is associated with metadata descriptive of the content; and a processor configured to receive a metadata request from the receiving entity in response to a change in value of the security identifier.

BRIEF DESCRIPTION OF THE DRAWINGS

The above and other aspects and features of the present disclosure will become more apparent upon consideration of the following description of embodiments, taken in conjunction with the accompanying drawing figures.

DETAILED DESCRIPTION

In the following detailed description, reference is made to the accompanying drawing figures which form a part hereof, and which show by way of illustration specific embodiments of the present invention. It is to be understood by those of ordinary skill in this technological field that other embodiments may be utilized, and that structural, electrical, as well as procedural changes may be made without departing from the scope of the present invention. Wherever possible, the same reference numbers will be used throughout the drawings to refer to the same or similar parts.

Embodiments of the present invention relate to a system and method for controlling distribution of information. The information may be secondary content (or metadata) that is typically associated with primary content of a linear broadcast. For example, the primary content may be a news cast, a sports program, a drama program, a radio program, VOD (video on demand) content, etc. According to particular embodiments, the distribution of the information is controlled by employing a security identifier. The security identifier may be a unique identifier, a cryptographic nonce, or a combination of the two.

Figure 1:
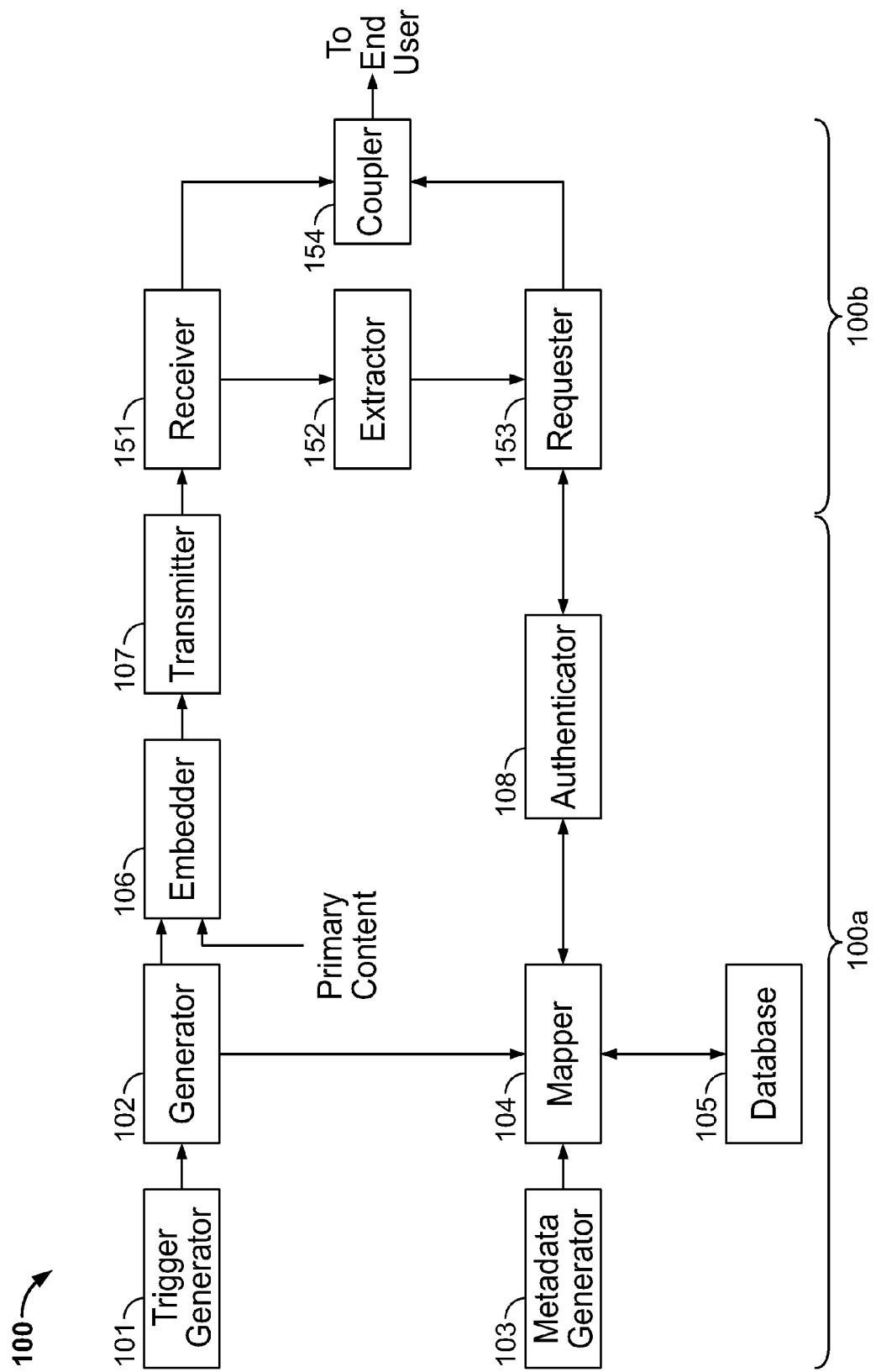
FIG. 1 illustrates a system for controlling distribution of information according to one embodiment.

FIG. 1 illustrates a system 100 for protecting distribution of information according to one embodiment. The system 100 includes a distributing entity 100a and a receiving entity 100b.

The distributing entity 100a distributes content (e.g., video and/or audio content) and includes a trigger generator 101, a metadata generator 103, a generator 102, a mapper 104, an embedder 106, a transmitter 107 and an authenticator 108.

The receiving entity 100b receives the content distributed by the distributing entity 100a. The receiving entity 100b includes a receiver 151, an extractor 152, a requester 153 and a coupler 154. According to particular embodiments, the receiving entity 100b is in a trusted relationship with the distributing entity 100a. However, it is understood that the receiving entity 100b may not necessarily be in a trusted relationship with the distributing entity 100a.

For convenience of description, certain structures and/or devices illustrated in FIG. 1 are described as being associated with the transmitting entity 100a, and other illustrated structures and/or devices are described as being associated with the receiving entity 100b. However, it is understood that the system 100 may include three (or more) entities and that each of the illustrated structures and/or devices may be associated with one or more of the three (or more) entities.

With continued reference to FIG. 1, the metadata generator 103 provides (or generates) metadata. The metadata relates to primary content and is descriptive of the content in some manner or aspect. Various types of metadata will be described in more detail later (with reference to FIG. 2).

According to embodiments of the present invention, it is intended that metadata ultimately is to be presented concurrently with the primary content, for the benefit of one or more end users. However, in order to control the distribution of the metadata, the metadata and the primary content are provided by the distributing entity 100a independently of one another (e.g., the metadata is provided at a separate time, after the primary content is provided). This will be described later in further detail.

The trigger generator 101 of FIG. 1 generates trigger signals. The trigger signals may be generated on a periodic basis and/or an aperiodic basis. Trigger signals generated on a periodic basis may be generated upon each passing of a particular data or time interval, e.g., every video frame, every minute, every hour, etc. In addition, or alternatively, trigger signals may be generated more irregularly, on an aperiodic basis. For example, a trigger signal may be generated upon an occurrence of a particular event (e.g., an asynchronous event).

The trigger signals generated by the trigger generator 101 are input to the generator 102. Upon receiving a trigger signal, the generator 102 generates a security identifier. The security identifier may be a cryptographical random identifier. For example, the security identifier may be a nonce.

The generator 102 may be a generally known device for generating an encrypted number or a random sequence of numbers. For example, the generator 102 may be a computational or physical device configured to generate a sequence of numbers or symbols that lacks any pattern, (or that appears random).

Because the value of the security identifier may be of a random nature, the security identifier, by itself, may carry little to no information. However, as will be described in more detail later, when the security identifier is used in certain contexts (e.g., the circulation and/or distribution of primary content), it may be used to derive useful information.

According to embodiments of the present invention, the security identifier is not derived from the primary content or any portion of the primary content. Rather, the generator 102 generates the security identifier independent of the content. For example, the security identifier is generated independent of any detailed analysis of the content that may be performed to determine unique features of the content. This reduces the likelihood that a party who receives the primary content (but not the security identifier) will be able to derive the security identifier nonetheless. This aspect will be described in more detail later.

The security identifier generated by the generator 102 is output to the mapper 104. The mapper may create an association between the value of the security identifier and the metadata produced by the metadata generator 103 (e.g., a current "snapshot" of the metadata). It is understood that the metadata is descriptive of primary content being processed.

As noted above, associations are created between values of the security identifier and particular metadata. Therefore, the security identifier may be configured to satisfy a certain statistical benchmark or level of performance with respect to statistics. For example, the size (e.g., length in bits) of the security identifier may be chosen to address what is known in probability theory as the "birthday problem."

According to the "birthday problem" phenomenon, there is a likelihood that, over a specific period of time, two different pieces of metadata will be associated with a same value of the security identifier. For example, if the security identifier is 32 bits in length and a security identifier is generated 60 times per second, the likelihood that a collision will occur (i.e., two pieces of metadata are associated with a same value of the security identifier) reaches 50% after 22 hours of operation. Accordingly, the size of the security identifier may be chosen to appropriately manage such a likelihood (or likelihoods).

The mapper 104 may create an association between a particular piece (or pieces) of metadata and a particular value of the security identifier generated by the generator 102. The created associations may be stored in a suitable storage device. For example, the associations may be stored in a form of a database 105 that stores data records. In such a database, each record may include a particular value of the security identifier and the corresponding piece (or pieces) of metadata. The associations may be stored in a secure environment such that they can become known only to particular parties (e.g., parties internal to the distributing entity 100a, approved parties located outside of the distributing entity 100a, etc.).

Each record may include other information. For example, one or more records may include timestamp information. The timestamp information may indicate a date and/or time at which the corresponding association was created. As will be described in more detail later, such information may be used by the distributing entity 100a for purposes of tracking distribution of the primary content.

In addition, each record may include information that was described earlier with reference to examples of metadata. For example, each record may include information regarding a particular channel or broadcast network for which the corresponding association was created.

As described earlier, values of the security identifier may be generated on a periodic basis and/or an aperiodic basis. Accordingly, according to embodiments of the present invention, the mapper 104 may create associations between metadata and security identifiers on a periodic basis and/or an aperiodic basis.

As will be explained in more detail later, the creation of associations between the metadata and security identifiers facilitates a subsequent retrieval of the metadata based on a metadata request that supplies the identifier (e.g., as a parameter included in the request).

With continued reference to FIG. 1, for each of the associations, the embedder 106 joins the respective security identifier with the primary content that corresponds to the respective piece (or pieces) of metadata. According to embodiments of the present invention, the embedder 106 embeds (or otherwise packages) the security identifier in the primary content to produce an embedded signal. This causes the identifier to become inseparable from the primary content, such that it is difficult to separate the security identifier from the primary content when the primary content is distributed to the receiving entity 100b.

The embedder 106 may embed the security identifier using any known techniques including metadata-based encoding and obfuscated encoding methods. For example, the security identifier may be embedded in the form of a digital watermark. In this situation, the primary content is treated as a host signal, and the security identifier is embedded to produce a watermarked signal. Other techniques may include VDS fields, audio signaling, closed captioning and extended data services, timecode signals according to standards such as the Society of Motion Picture & Television Engineers (SMPTE) 12M standard, ancillary data (ANC data) embedded within the serial digital interface (SDI, or high definition SDI (HD SDI)) according to standards such as SMPTE 291M, ANC data mapped to a material exchange format (MXF) file via SMPTE 436M, MPEG-2 file format transport streams, MPEG-2 transport streams according to standards such as the Society of Cable Telecommunications Engineers (SCTE) 35 and SCTE 104 standards, video watermarking, audio watermarking, and the like.

The embedder 106 may be implemented using known technologies, e.g., known third-party solutions. For example, the generator 102 may be a computational or physical device configured to perform obfuscated embedding operations such as digital watermarking. In another example, a commodity closed-caption inserter may be used to perform metadata-based encoding of the security identifier information. The inserter may be used to generate a valid closed-caption stream with a caption window defined but set to hidden and never displayed. The closed-caption stream may be used to provide the security identifier information which is generated once per second, or another time interval as discussed further herein. The in-band "Reset" command may be used to delineate the end of the code containing the security identifier information. It is understood that different embedding techniques may require or call for different bandwidth requirements.

Once the identifier is embedded into the primary content, the primary content may be ready for distribution (or transmission). As noted earlier, according to embodiments of the present invention, the metadata is not distributed at this juncture. Rather, the metadata is supplied at a later juncture (e.g., after the primary content is received at the receiving entity 100b).

With reference back to FIG. 1, the transmitter 107 transmits the embedded signal produced by the embedder 106. According to an embodiment of the present invention, the transmission is performed in cooperation with a satellite communication channel. According to other embodiments, the transmission is performed in cooperation with a terrestrial (e.g., over-the-air) communication channel. According to other embodiments, the transmission is performed via fiber-, cable- or Internet-based technologies.

According to yet other embodiments, the embedded signal is distributed using physical media. For example, the embedded signal may be distributed using video tapes, DVDs, other types of storage media, hard drives, etc.

Structures and devices of receiving entity 100b (and additional structures and devices of the distributing entity 100a) will now be described in more detail with continued reference to FIG. 1. As noted earlier, the receiving entity 100b may be in a trusted relationship with the distributing entity 100a. As also noted earlier with reference to FIG. 1, the receiving entity 100b includes a receiver 151, an extractor 152, a requester 153 and a coupler 154.

The receiver 151 receives the embedded signal that was distributed (or transmitted) by the transmitter 107. The receiver 151 may be configured to receive signals via any of the distribution techniques described earlier (e.g., satellite communication, terrestrial communication, physical media, etc.)

The received signal is provided to the extractor 152, which detects a presence of the embedded security identifier in the received signal. If such a presence is detected, the extractor 152 extracts the embedded security identifier from the received signal.

The extractor 152 is configured to extract security identifiers that had been embedded using any of the techniques described earlier. For example, if the security identifier was embedded using digital watermark techniques, the extractor 152 detects the security identifier in the host signal (the primary content) and, accordingly, extracts the security identifier from the host signal.

The extractor 152 may be implemented using known technologies, e.g., known third-party solutions. For example, the extractor 152 may be a computational or physical device configured to extract digital watermarks.

The requester 153 receives the extracted security identifier from the extractor 152. The requester 153 prepares a request for metadata relating to the primary content of the received signal (the signal that was received by the receiver 151). As described earlier with reference to various embodiments, the security identifier was derived not from the primary content or any portion of the primary content. Rather, the security identifier was generated independent of the primary content. As such, it may be difficult for the requester 153 to derive (or otherwise acquire) the security identifier, without receiving it from the extractor 152.

The requester 153 uses the security identifier as a part of a metadata request. For example, the security identifier may be used as a parameter in such a request. According to embodiments of the present invention, the metadata request may include other parameters, e.g., additional authentication and access information, one or more passwords, etc.

The metadata request may be sent from the requester 153 to the authenticator 108 via a two-way communication channel or a one-way communication channel. For example, the metadata request may be sent via an IP (Internet Protocol) connection, or another suitable network connection.

Also, the metadata request may be sent from the requester 153 to the authenticator 108, either directly or indirectly. If sent indirectly, the metadata request may be effectively relayed to the authenticator 108 by an additional entity (e.g., a multiple-system operator (MSO)).

With continued reference to FIG. 1, the authenticator 108 receives the metadata request. As described earlier, the metadata request includes the security identifier. The authenticator 108 accesses the database 105, to query whether any metadata corresponds to the security identifier (or whether the security identifier of the metadata request matches a security identifier stored in the database 105). If corresponding metadata is located (or there is a match), the located metadata (or metadata corresponding to the matching security identifier) is provided to the authenticator 108 for delivery to the requester 153.

The record including the located metadata may be deleted from the database 105 after it is retrieved. In addition, records that are not retrieved from the database 105 may be deleted from the database after a certain period of time has passed.

According to a further embodiment, the authenticator 108 may update a log or report regardless of whether any metadata corresponds to the security identifier of the metadata request. As will be described in more detail later, such a record may be useful for data tracking purposes.

The metadata may be provided from the authenticator 108 to the requester 153 via the two-way communication channel (that also carried the metadata request) or a one-way communication channel. Similar to the metadata request, the metadata may be effectively relayed to the requester 153 by a separate entity (e.g., an MSO).

According to other embodiments, the metadata is distributed through other means, including the distribution of a data file via physical media (e.g., a DVD) or through forward-only distribution methods (another data channel).

Upon receipt of the metadata by the requester 153, the receiving entity 100b may couple the metadata with the primary content (that was received by the receiver 151). For example, the coupler 154 may package the metadata (provided by the requester 153) and the primary content (provided by the receiver 151) in a form suitable for processing by an end user. According to one embodiment, the coupler 154 packages the metadata and the primary content in the form of an MXF wrapper that may include files such as a metadata file and a content file. In some configurations, the coupler 154 may be configured in software implementations, including compiled applications on various platforms including computer operating systems, mobile phone operating systems, home media and video game operating systems, or scripted applications including HTML5, Javascript, Lua, and the like. The coupler 154 may also be configured in fixed-function software including set top boxes, connection enabled televisions, DVD and BLU-RAY players, and the like. In yet other examples, the coupler may be configured in a cloud-based implementation, such as streaming video services.

Further, cloud-based implementation may be used for various components and elements of the system discussed herein, and it will be understood by those of ordinary skill in the art that the system, including features such as the receiver 151, extractor 152, requester 153, authenticator 108, generator 102, embedder 106, and the like may be wholly or individually implemented using cloud-based services.

The metadata and the primary content are delivered to an end user for its viewing pleasure. According to embodiments of the present invention, the end user may be an individual viewer (e.g., an individual subscriber or consumer). According to other embodiments, the end user may be two or more individual viewers. According to yet other embodiments, the end user may be individual viewers that are located in a particular geographic region.

Figure 2:
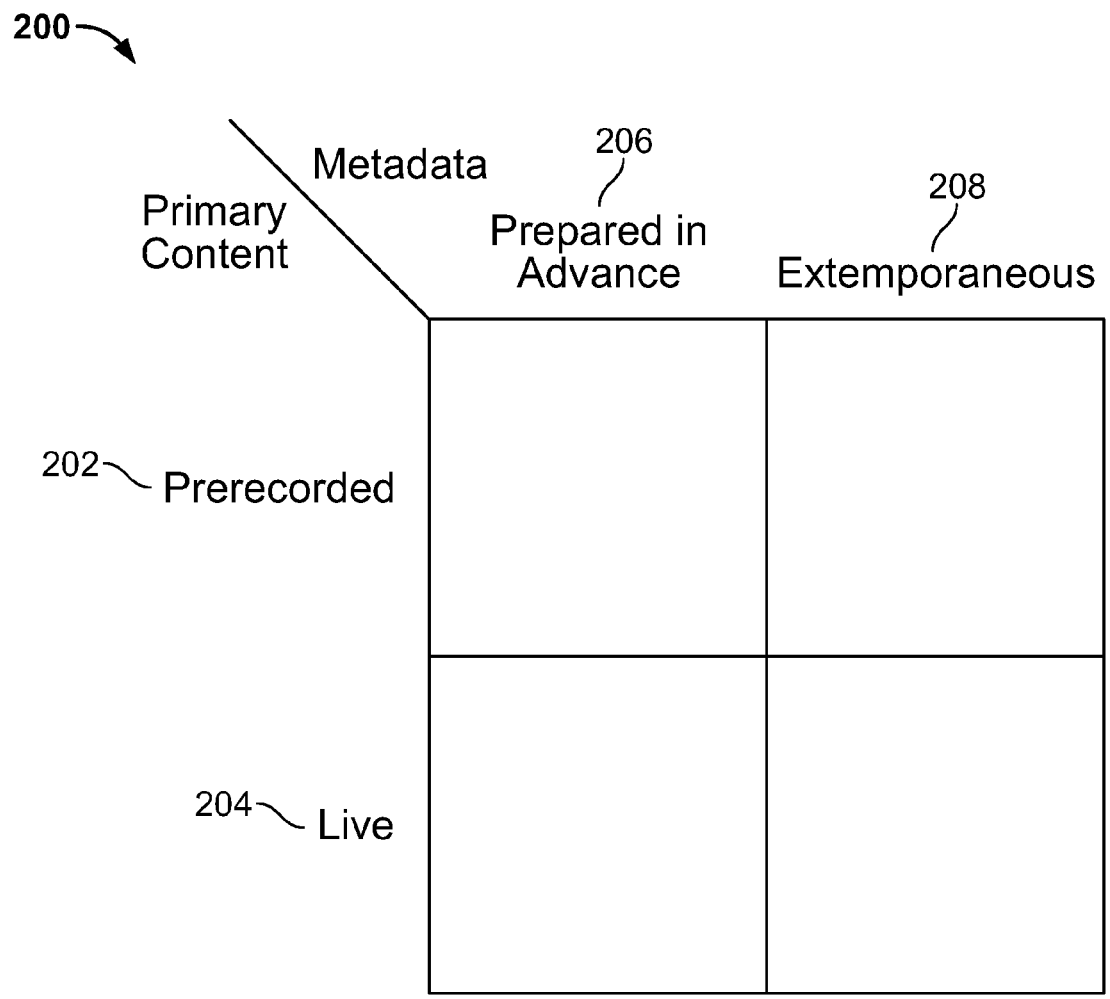
FIG. 2 illustrates a matrix illustrating potential associations between primary content and metadata.

The primary content that is distributed by the distributing entity 100a may include at least audio data or video data, and may be similar to the primary content provided in a linear broadcast. FIG. 2 illustrates a matrix 200 illustrating potential associations between primary content and metadata. Accordingly, a particular association between primary content and metadata may correspond to any of the entries in the matrix.

In the matrix of FIG. 2, types of the primary content are identified in respective rows. The primary content may include pre-recorded content 202 (e.g., a pre-recorded drama program). Also, the primary content may include live content 204 (e.g., a live broadcast of a sporting event, a live newscast).

In the matrix of FIG. 2, types of the metadata are identified in respective columns. The metadata may include prepared metadata 206 (e.g., metadata that is prepared in advance). Also, the metadata may include information that is more extemporaneous 208 in nature.

Prepared metadata 206 may include information that is similar to electronic program guide (EPG) information. For example, prepared metadata may indicate a title of the primary content (e.g., a title of a particular program), a source of the primary content (e.g., a particular channel or network providing the content), and/or date and time information (e.g., a broadcast (or air) date, and start and end times of the broadcast (or airing)). Additionally, the prepared metadata 206 may indicate ratings information (e.g., TV Parental Guidelines information), and the names and other biographical information of program participants (e.g., actors, directors, producers, etc.)

The prepared metadata noted above may relate to a particular program for its entire duration. Therefore, the prepared metadata 206 may not necessarily require updating (or may not necessarily change) while the particular program is in progress.

In addition, the prepared metadata 206 may include information that is finer in granularity than the metadata which relates to a particular program for its entire duration. For example, the primary content may contain commercial or advertisement breaks, during which one or more commercials or promotional announcements are shown. In this situation, the prepared metadata 206 may indicate a start and/or end point of one or more of the breaks. To mark each of the one or more breaks, the noted metadata may require updating while the particular program is in progress.

As another example, prepared metadata 206 may be of particular use for viewers of delayed or repackaged coverage of sporting events. In the case of repackaged sports programming (e.g., prime-time Olympics programming that covers two or more different sporting events over the course of a single time slot), the information may identify the particular sporting event (e.g., swimming, diving, gymnastics, etc.) that is being shown.

As another example, the prepared metadata 206 may provide supplementary information relating to a particular portion of the content (e.g., a particular scene or shot in a movie or television show).

As noted earlier with reference to FIG. 2, the metadata may include not only prepared metadata but also information that is more extemporaneous in nature 208. Such metadata may provide information similar to the information described earlier with reference to prepared metadata. For example, in the case of particular types of primary content (e.g., a live sporting event), an anticipated end time of the live sporting event (as well as a start time of a following program) may be later or earlier than an originally scheduled time. In this case, metadata that is more extemporaneous in nature 208 may be provided while the sporting event is in progress, to provide updates as to the anticipated end time of the event (as well as the anticipated start time of the program that immediately follows).

Other types of extemporaneous metadata 208 may include information that is related to specific portions of the content (e.g., specific portions of a particular piece of programming). This information may be of particular use for viewers of live programming.

For example, in the case of a news broadcast, the information may indicate the topic of a particular news story that is being reported. Also, the information may include supplementary information that may not be reported on-the-air by the news anchor or reporter.

In the case of sports programming, information of the extemporaneous metadata may include information of relevance to the particular sporting event (e.g., current game score, position of the ball, game clock information, etc.).

According to embodiments of the present invention, metadata (e.g., metadata produced by the metadata generator 103 of FIG. 1) complies with a known standard for digital content metadata. However, it is understood that the metadata may not necessarily comply with any particular standard. In addition, the metadata may also include pointers to other metadata (or metadata files) or information. For example, the metadata may include a Rovi ID or a Wikipedia URL (uniform resource locator).

As described earlier with reference to FIG. 1, the generator 102 produces values of the security identifier on a periodic basis and/or an aperiodic basis. Accordingly, associations between metadata and values of the security identifier are also created periodically or aperiodically.

Periodically created associations may be suitable, for example, in the case of metadata that is similar to EPG information. Aperiodically created associations may be suitable, for example, in the case of metadata that indicates or provides the topic of a particular news story that is being reported during a news broadcast, as well as the supplementary information noted earlier with respect to a particular scene or shot in a television show.

According to one embodiment, the metadata generator 103 and the mapper 104 (see FIG. 1) may include (or be coupled to) a device for providing a user interface that accepts input from a user (e.g., a human operator). Such an interface may be used to generate the more extemporaneous metadata that was described earlier (e.g., the anticipated end time of a live sporting event). In addition, such an interface may be used to edit or correct metadata, as well as to edit or correct associations (or groups of associations) between metadata and primary content.

Figure 3:
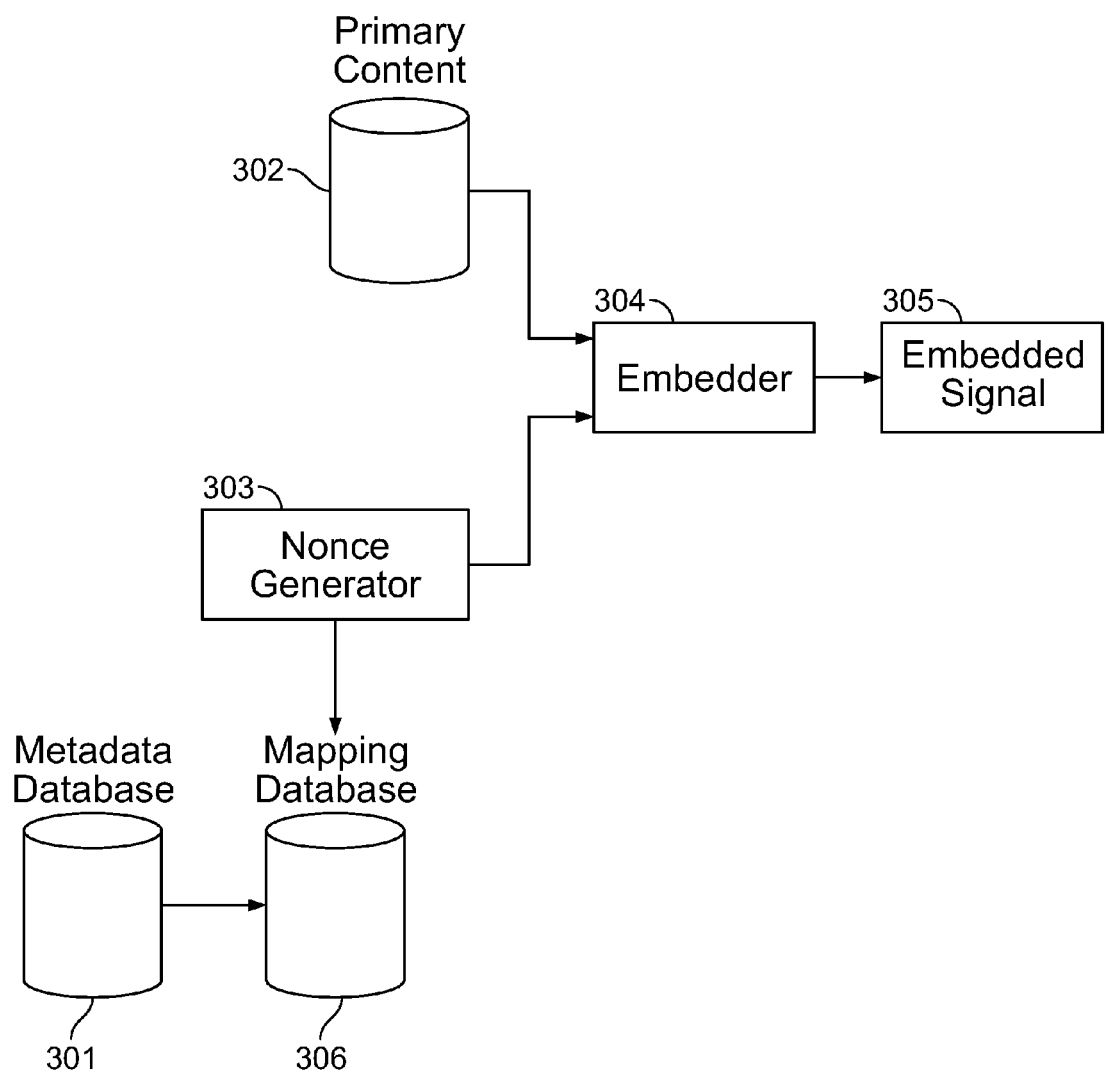
FIG. 3 illustrates an example of controlling distribution of metadata according to an aspect of the present invention.

An aspect of the present invention will now be described with reference to the example illustrated in FIG. 3. With reference to FIG. 3, metadata 301 relates to at least a portion of primary content 302. An association is created between the metadata 301 and a security identifier generated by generator 303. In the depicted embodiment, the security identifier may be generated as an encrypted nonce, however it will be understood that the security identifier may be generated as any unique identifier, as discussed herein. The security identifier generated by generator 303 is embedded into a signal with the primary content by embedder 304 to produce an embedded signal 305. As such, the embedded signal 305 effectively carries the primary content 302. In addition, the embedded signal 304 carries the security identifier generated by generator 303.

Further, a mapping database 306 may be provided to store each security identifier generated by generator 303 in a record, wherein each security identifier is associated with metadata stored in metadata database 301 corresponding to the primary content 302. In other embodiments, metadata database 306 may be configured to store the security identifier to be associated with a pointer to another source for the associated metadata corresponding to the primary content 302, such as an external server, a web URL, and the like.

Figure 4:
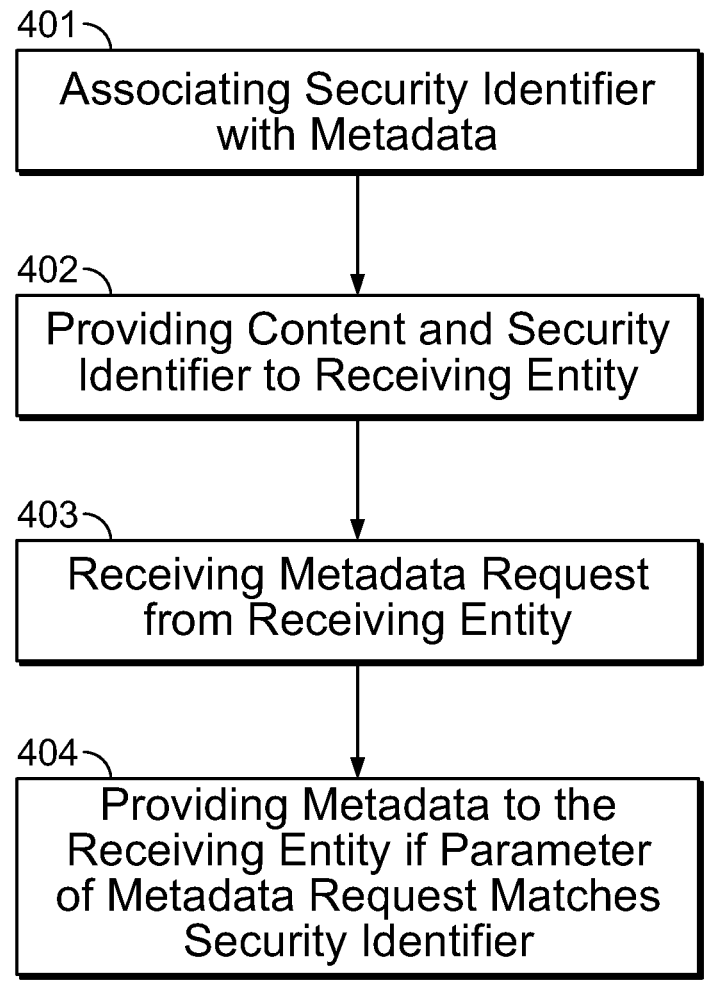
FIG. 4 is a flowchart illustrating a method of controlling distribution of content and metadata corresponding to the content, according to one embodiment.

The flowchart of FIG. 4 illustrates a method of controlling distribution of content and metadata corresponding to the content. With reference to FIG. 4, the method includes associating a security identifier with metadata (box 401). The metadata is descriptive of the content.

The content and the security identifier are provided to a receiving entity (box 402). In this regard, the security identifier is provided in lieu of the metadata. The content and the security identifier may be provided by embedding the security identifier into the content to produce an embedded signal and providing the embedded signal.

The method further includes receiving a metadata request from the receiving entity (box 403). The metadata request may be received in response to a change in value of the security identifier.

The metadata is provided to the receiving entity if a parameter included in the received metadata request matches the security identifier (step 404). Alternatively (or in addition), receipt of the content may also be recognized.

As described earlier, according to embodiments of the present invention, the metadata request (issued, e.g., by the requester 153 of FIG. 1) may include one or more additional parameters such as additional authentication and access information, one or more passwords, etc. Alternatively, the additional parameters may be included in the security identifier in encrypted form. According to such embodiments, additional parameters may be used (e.g., by the authenticator 108) to effectively customize the metadata that is provided (e.g., to the receiving entity 100b of FIG. 1).

In more detail, after authenticating the metadata request based on the security identifier included in the request, the authenticator 108 may also select one of various sets of metadata based on the additional parameters.

For example, a particular piece of primary content may be a television program. Different sets of metadata may be generated for the television program, including a more comprehensive first set and a less comprehensive second set that may contain less metadata (and/or less-detailed metadata) as compared to the first set. The first set of metadata and the second set of metadata may be associated with the same security identifier, but with different authentication or access identifiers. (Alternatively, the first set of metadata and the second set of metadata may be associated with different security identifiers.)

Accordingly, different metadata may be provided to different customers (e.g., a "gold level" customer and a "bronze level" customer). For example, the first set of metadata may ultimately be distributed to the "gold level" customer (by utilizing the security identifier and, additionally, a first access identifier). Also, the second set of metadata may ultimately be distributed to the "bronze level" customer (by utilizing the security identifier and, additionally, a second access identifier).

Different levels of metadata may be distinguished by, for example, the amount of the metadata included, presence or absence of advertisements accompanying the metadata, varying subsets of the content—including active versus passive metadata content, configuration of content, availability of parental controls, and the like. Alternatively, the level or content of the metadata provided may be determined based on a user preference or user profile associated with the request, for example, parental controls.

To provide granular access control to metadata based on various factors including identity of the requester, location of the request, timezone of the request, etc., the authenticator 108 may be configured to require and accept various parameters included with, or in addition to the security identifier received from the requester 153. For example, identifiers may be assigned to each authorized requester including passwords, prefix or suffix codes, authorized MAC addresses, device serial numbers, and the like.

Other required parameters may include the requester operating system or other system information, mode of consumption (e.g., live, on-demand, DVR time shifted, etc.), a-priori metadata (e.g., tuned channel, source website, source content identifier), source IP address, and the like. As an example, if a determination is made that primary content is being consumed on a DVR time shifted basis (as opposed to being consumed live during a broadcast), certain metadata may be provided or even suppressed, such as suppressing metadata pertaining to live polling information during a broadcast show wherein a viewer is asked to call into a polling service to cast live votes.

In some embodiments, the system may include a configuration wherein metadata is distinctively provided based on a history of requests received from an identified requester. The authenticator may be configured to store received requests in database 105 or other records databases configured for storing entries for each request received. Therefore a quantity of previous requests may be tracked and detected by the authenticator to determine the metadata to be provided. This information may also be combined with information gathered from other parameters or attributes of the requester, including viewing habits, viewing history, user preferences, and the like.

For example, based on viewing habits, "rerun" secondary content may be provided instead of "first run" secondary content if it is determined that the identified requester is requesting access to metadata associated with a primary content which the requester has already previously consumed. Alternatively, this configuration may also prevent unauthorized requesters by detecting potentially leaked credentials of authorized requesters, or repeated access abuse by a particular requester exceeding a maximum value of metadata requests.

In alternative embodiments the system may include a configuration in which metadata is distinctively provided in response to requests based on attributes or data points unrelated to the specific identity of the requester. For example, the authenticator 108 may be configured, either itself or via other components of the system, to obtain environmental or demographic information to determine the metadata provided to a requester 153 in response to a request. The obtained information may include parameters such as a time of day of the request, language, timezone, country, geographic location, IP address ranges, concurrent requests from other requesters having the same demographic identifiers, and the like. Using the obtained environmental or demographic information, the authenticator may determine the metadata to be provided in response to a request wherein the determination is unrelated to the identity of the requester.

Requests for metadata may be used not only to provide metadata to an end user, but also to track the distribution of primary content. For example, the receipt of a particular metadata request may serve as verification (or confirmation) that a particular piece of content was successfully or properly distributed. In this regard, such a receipt may be used to verify that certain parties are receiving particular content and also that such parties are not receiving other content (e.g., coverage of a blacked-out sporting event).

In other embodiments the parameters discussed above may be set as optional parameters, or may be combined with other parameters either required or optional, to allow the authenticator to authenticate the request and provide matched metadata in response to the request.

Further, as disclosed earlier, records (such as the records stored in the database 105 of FIG. 1) may also include timestamp information. The timestamp information may indicate an expected (or actual) date and/or time at which the security identifier is to be distributed with the primary content.

The above timestamp information may be used to determine if content is being used outside of a licensed time period. For example, if a distributing entity receives a request for metadata that corresponds to primary content that was distributed a long while ago (e.g., 1 year), it may be proper to interpret the metadata request as an indication that content is being used in an unlicensed fashion. In this regard, records that have reached a certain age (measured, for example, in hours, days, months or years) may be deleted (from the database 105). Implementation of a timestamp may further be used to limit the records needed to be stored at any given time. The system may be configured to purge metadata records from the database 105 having a timestamp older than a threshold time limit, thereby allowing the database to remove records regardless of whether they have been accessed.

In some embodiments, the generator 102 may be configured to encrypt or otherwise include a timestamp in the security identifier associated with a timestamp at which the security identifier was generated. In such a configuration, the authenticator 108 may be configured to decode the security identifier to obtain the encrypted or otherwise included timestamp, and to reject any requests having an included timestamp older than a threshold time period. In such a configuration, the authenticator may provide a layer of security or efficiency by filtering unauthorized or outdated requests without reference to the database 105.

According to other embodiments, metadata may not necessarily be provided, in response to receiving the metadata request. Rather, the distributing entity 100a may use the metadata request purely for tracking purposes. In such situations, the metadata request may effectively serve as a NOP (No Operation) operation from the perspective of the receiving entity 100b (see FIG. 1).

In other embodiments, a denial of a request for metadata may be used as an opportunity to present the requester with additional information regarding the metadata service. Therefore, in a case where a submitted request is determined to contain an unauthenticated security identifier, the authenticator may redirect the requester, or present the requester with information on how to obtain authenticated security identifiers.

For example, in case where a request includes a security identifier which has already been accessed, is expired, or does not correspond to a valid metadata record, the authenticator may determine that the request is originating from an unauthorized source, such as pirated content. The authenticator may be configured to return alternate information regarding authorized sources of the content related to the requested metadata, methods of obtaining the authorized content, pricing for the authorized content, and the like. This configuration may also allow the original content distributor to identify specific downstream distributors as the source of pirated content when an authorized metadata request is received, wherein the request includes a parameter identifying the downstream distributor.

According to embodiments of the present invention, a security identifier is used to control the distribution of metadata that is not transmitted together with the primary content. According to other embodiments, the metadata is protected via other techniques. For example, the metadata may be convolutionally encoded (or cryptographically encoded) and transmitted together with the primary content.

Features disclosed with respect to embodiments of the present invention may be suitable for use in systems for storing, reproducing, ingestion, annotation, cataloging, retrieval and distribution of digital assets such as photographs, movies, television productions, animations, video, music and other forms of audio production, etc. Features disclosed may be applied in the distribution of content including stored content and/or streaming content. Features disclosed may also be used to facilitate not only commercial (or non-commercial) distribution of content, but also management of the content through production, post production, storage, retrieval, etc. For example, features may be employed to aid processes/operations not related to distribution, such as on-set/on-location production, content acquisition, and processing during operations in which the integrity/authenticity of the content must be verified at a later date.

According to embodiments of the present invention, a distribution entity and a receiving entity in a system may include one or more computer systems, computer processors, storage devices, distribution channels, etc., in order to distribute content to a target audience. Portions of the content may reside in different locations, or may be distributed widely and coordinated with one another, particularly in a large organization. Moreover, particular portions may reside in entirely separate environments, such as content distribution chains, clearing houses, content creation companies, etc.

Various embodiments described herein may be implemented in a computer-readable medium, a machine-readable medium, or similar medium using, for example, software, hardware, or any combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by a controller or a processor (e.g., a processor of authenticator 108 of FIG. 1).

For a software implementation, certain embodiments described herein may be implemented with separate software modules, such as procedures and functions, each of which perform one or more of the functions and operations described herein. The software codes can be implemented with a software application written in any suitable programming language and may be stored in memory and executed by a controller or processor.

The foregoing disclosed embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A content distribution method comprising:
generating, by at least one hardware processor at a content distributor, a security identifier associated with content;
storing the security identifier in a memory to be associated with metadata related to the content;
including the generated security identifier in a signal comprising the content to produce an embedded signal;
transmitting, by a hardware transmitter, the embedded signal to a receiving entity;
receiving a first metadata request from the receiving entity, wherein the first metadata request is requesting metadata related to the content and comprises the generated security identifier;
providing, by the hardware transmitter, a first metadata to the receiving entity when the generated security identifier received in the first metadata request comprises information matching the stored security identifier;
storing first request information comprising the first metadata request;
receiving a second metadata request from the receiving entity after providing the first metadata to the receiving entity, wherein the second metadata request is requesting the metadata related to the content and comprises the generated security identifier;
determining, at the content distributor, whether the first metadata has already been provided to the receiving entity based on the stored first request information and the generated security identifier received in the second metadata request; and
providing, by the transmitter, a second metadata different from the first metadata to the receiving entity when the generated security identifier received in the second metadata request comprises information matching the stored security identifier and the receiving entity has already been provided the first metadata based on the determination,
wherein the first and second metadata are subsets of a plurality of subsets of the metadata corresponding to different levels of the metadata, and
wherein levels of metadata corresponding to the first and second metadata are selected from the plurality of subsets of the metadata based on a portion of data included in the security identifier.

2. The content distribution method of claim 1, further comprising:
recognizing receipt of the content by the receiving entity in response to receiving the first metadata request when the received first metadata request comprises information matching the stored security identifier.

3. The content distribution method of claim 1, wherein the security identifier comprises a cryptographic nonce.

4. The content distribution method of claim 1, wherein the generated security identifier comprises an encrypted timestamp, the method further comprising providing the first metadata to the receiving entity when a difference between a time of the first metadata request and the encrypted timestamp does not exceed a threshold value, and denying the first metadata request when the difference exceeds the threshold value.

5. The content distribution method of claim 1, further comprising:
storing the security identifier to be associated with a timestamp,
providing the first metadata to the receiving entity when a difference between a time of the first metadata request and the associated timestamp does not exceed a threshold value; and
denying the first metadata request when the difference exceeds the threshold value.

6. The content distribution method of claim 1, further comprising deleting the stored security identifier from the memory after a threshold period of time.

7. The content distribution method of claim 1, wherein the security identifier is generated in response to a trigger generated periodically or aperiodically.

8. A method for receiving content, the method comprising:
receiving, by a hardware receiver, the content from a distributing entity;
extracting, by at least one processor, a security identifier from the received content;
sending, by a transmitter, to the distributing entity, a first request for metadata related to the received content and comprising the extracted security identifier;
receiving, by the receiver, a first metadata when the extracted security identifier matches a security identifier maintained by the distributing entity associated with the content;
sending, by a transmitter, to the distributing entity, a second request for metadata related to the received content, wherein the second request comprises the extracted security identifier; and
receiving, by the receiver, a second metadata different from the first metadata when the extracted security identifier matches the security identifier maintained by the distributing entity associated with the content and the distributing entity determines that the first metadata has already been provided to the receiver,
wherein the first and second metadata are subsets of a plurality of subsets of the metadata corresponding to different levels of the metadata, and
wherein levels of metadata corresponding to the first and second metadata are selected from the plurality of subsets of the metadata based on a portion of data included in the extracted security identifier.

9. The method for receiving content of claim 8, further comprising:
including identifying information in the request for metadata; and
receiving different formats of the first metadata based on the identifying information.

10. The method for receiving content of claim 8, further comprising coupling the received content and the received second metadata to a combined signal and providing the combined signal to a viewer.

11. A system for distributing content, the system comprising:
- at least one processor at a content distributor;
- a memory; and
- a transmitter;
- wherein the at least one processor is configured to:
    - generate a security identifier associated with content to be distributed to a receiving entity;
    - cause the memory to store the security identifier to be associated with metadata related to the content;
    - include the generated security identifier in a signal comprising the content to produce an embedded signal;
    - cause the transmitter to transmit the embedded signal to the receiving entity;
    - receive a first metadata request from the receiving entity, wherein the first metadata request is requesting metadata related to the content and comprises the generated security identifier;
    - cause the transmitter to transmit a first metadata to the receiving entity when the generated security identifier received in the first metadata request comprises information matching the stored security identifier;
    - cause the memory to store first request information comprising the first metadata request;
    - receive a second metadata request from the receiving entity, wherein the second metadata request is requesting the metadata related to the content and comprises the generated security identifier;
    - determine whether the first metadata has already been provided to the receiving entity based on the stored first request information and the generated security identifier received in the second metadata request; and
    - cause the transmitter to transmit a second metadata different from the first metadata to the receiving entity when the generated security identifier received in the second metadata request comprises information matching the stored security identifier and the receiving entity has already been provided the first metadata based on the determination,
    - wherein the first and second metadata are subsets of a plurality of subsets of the metadata corresponding to different levels of the metadata, and
    - wherein levels of metadata corresponding to the first and second metadata are selected from the plurality of subsets of the metadata based on a portion of data included in the security identifier.

12. The system of claim 11, wherein the processor is further configured to:
- recognize receipt of the content by the receiving entity in response to receiving the first metadata request when the received first metadata request comprises information matching the stored security identifier.

13. The system of claim 11, wherein the security identifier comprises a cryptographic nonce.

14. The system of claim 11, wherein the generated security identifier comprises an encrypted timestamp, and the processor is further configured to:
- provide the first metadata to the receiving entity when a difference between a time of the first metadata request and the encrypted timestamp does not exceed a threshold value; and
- deny the first metadata request when the difference exceeds the threshold value.

15. The system of claim 11, wherein the processor is further configured to:
- cause the memory to store the security identifier to be associated with a timestamp;
- provide the first metadata to the receiving entity when a difference between a time of the first metadata request and the encrypted timestamp does not exceed a threshold value; and
- deny the first metadata request when the difference exceeds the threshold value.

16. The system of claim 11, wherein the processor is further configured to delete the stored security identifier from the memory after a threshold period of time.

17. The system of claim 11, wherein the processor is further configured to generate the security identifier in response to a trigger generated periodically or aperiodically.

* * * * *